United States Patent
Nagashima

(10) Patent No.: US 7,720,210 B2
(45) Date of Patent: May 18, 2010

(54) CTI SYSTEM

(75) Inventor: Kunio Nagashima, Kawasaki (JP)

(73) Assignee: NEC Infrontia Corporation, Kawasaki-shi (JP)

( * ) Notice: Subject to any disclaimer, the term of this patent is extended or adjusted under 35 U.S.C. 154(b) by 1438 days.

(21) Appl. No.: 11/079,395

(22) Filed: Mar. 15, 2005

(65) Prior Publication Data

US 2005/0207551 A1    Sep. 22, 2005

(30) Foreign Application Priority Data

Mar. 16, 2004    (JP)    ............... 2004-075116

(51) Int. Cl.
  *H04M 3/42*    (2006.01)
  *G06K 7/10*    (2006.01)
  *G06K 9/22*    (2006.01)

(52) U.S. Cl. .................. 379/201.06; 379/201.1; 235/462.45; 235/462.46; 235/472.01; 235/472.02

(58) Field of Classification Search .......... 379/201.06, 379/201.01, 201.1; 705/14; 235/462.01, 235/436, 435, 462.46, 462.45, 472.01, 472.02
See application file for complete search history.

(56) References Cited

U.S. PATENT DOCUMENTS

| | | | |
|---|---|---|---|
| 5,197,092 A | 3/1993 | Bamburak | |
| 5,825,864 A | 10/1998 | McGraw et al. | |
| 6,128,502 A | 10/2000 | Wizgall et al. | |
| 6,393,271 B1 | 5/2002 | Dougherty | |
| 7,072,308 B2 | 7/2006 | Strathmeyer et al. | |
| 2002/0004403 A1 | 1/2002 | Yariv et al. | |
| 2003/0235173 A1 | 12/2003 | Wood | |
| 2004/0186768 A1* | 9/2004 | Wakim et al. ............... 705/14 |

FOREIGN PATENT DOCUMENTS

| | | |
|---|---|---|
| JP | 01-170155 | 7/1989 |
| JP | 01-189263 | 7/1989 |
| JP | 05-083384 | 4/1993 |
| JP | 10-075305 | 3/1998 |
| JP | 11-205464 | 7/1999 |
| JP | 2002-077363 A | 3/2002 |
| JP | 2002-77363 A | 3/2002 |
| JP | 2002-186043 A | 6/2002 |
| JP | 2003-224677 A | 8/2003 |
| JP | 2004-032587 A | 1/2004 |
| JP | 2004-523967 A | 8/2004 |

* cited by examiner

*Primary Examiner*—Thjuan K Addy
(74) *Attorney, Agent, or Firm*—Foley & Lardner LLP

(57) ABSTRACT

A CTI system comprises a telephone terminal (12-2) having an ID tag (18-2), a server-connected main unit (11, 13) for controlling the telephone terminal, and an information processing terminal (16-1) having an ID reader and a communication unit (CU). By positioning the ID reader of the information processing terminal and the ID tag of the telephone terminal in close proximity to each other, the ID reader reads ID information of the ID tag in a non-contact manner. The information processing terminal sends the ID information read by the ID reader to the main unit by the use of the communication unit. The main unit associates the information processing terminal with the telephone terminal with reference to the ID information. The main unit is responsive to a request of the information processing terminal and carries out call control for the telephone terminal associated with the information processing terminal.

20 Claims, 12 Drawing Sheets

CTI SYSTEM

This application claims priority to prior Japanese patent application JP 2004-75116, the disclosure of which is incorporated herein by reference.

BACKGROUND OF THE INVENTION

This invention relates to a CTI system.

Japanese Unexamined Patent Application Publication (JP-A) No. 2002-77363 discloses a CTI (Computer Telephony Integration) system including an exchange, a telephone set connected to the exchange, and a personal computer (PC) connected to the telephone set. The patent application Publication further discloses that, in the CTI system, it is possible to notify a caller number from a multifunctional telephone set to the PC by the use of a caller number notification service of a telephone line, to display caller information, such as an address or a company name of a caller, on the PC with reference to the caller number, and to control an operation of the telephone set from the PC.

Referring to FIG. 1, a related CTI system as a basis of this invention will be described. The related CTI system comprises a main unit (exchange) 11 connected to a network 10 (which is typically, a telephone network (external line)), first and second telephone terminals (TEL1 and TEL2) 12-1 and 12-2 connected to the main unit 11, a CTI server (computer) 13 connected to the main unit 11, a LAN (Local Area Network) 14 connected to the CTI server 13, and first and second information processing terminals (clients 1 and 2) 15-1 and 15-2 connected to the LAN 14. In this case, each of the first and the second information processing terminals (clients 1 and 2) 16-1 and 15-2 illustrated in the figure is a personal computer (PC) having a communication unit CU for communicating with the CTI server 13 of the main unit 11 through the LAN 14.

The client 15-1 is arranged nearer to the first telephone terminal 12-1 than to the second telephone terminal 12-2. The client 15-2 is arranged nearer to the second telephone terminal 12-2 than to the first telephone terminal 12-1. In the main unit 11 (or in the CTI server 13), association between the client 15-1 (ID (Identification) data thereof) and the first telephone terminal 12-1 (ID data thereof) and association between the client 15-2 (ID data thereof) and the second telephone terminal 12-2 (ID data thereof) are fixedly (statically) established as setting information.

As described above, in the CTI system illustrated in FIG. 1, the information processing terminals and the telephone terminals are fixedly (i.e., statically) associated with each other. In the CTI system illustrated in FIG. 1, it is assumed that the information processing terminal (client 1) 15-1 is a portable PDA (Personal Digital Assistant) having a communication unit CU for communicating with the CTI server 13 of the main unit 11 through the LAN 14 and that a WAP (Wireless Access Point) is connected to the LAN 14 so as to enable radio connection of the PDA to the LAN 14.

In this case, even if a possessor of the client (PDA) 15-1 carries the client (PDA) 15-1 and moves away from the first telephone terminal 12-1 to a position near the second telephone terminal 12-2, the main unit 11 sends a call destined to the possessor of the client (PDA) 15-1 to the first telephone terminal 12-1. Therefore, the possessor of the client (PDA) 15-1 can not respond to the call.

In order to associate the client (PDA) 15-1 with the second telephone terminal 12-2, it is necessary to change the association between the information processing terminals and the telephone terminals. For this purpose, the main unit 11 (or the CTI server 13) is directly operated or the client (PDA) 15-1 as the information processing terminal is operated so as to change the setting information in the main unit 11 (or the CTI server 13). In either event, however, a troublesome operation is required.

SUMMARY OF THE INVENTION

It is an object of this invention to dynamically associate an information processing terminal with a telephone terminal.

It is another object of this invention to associate an information processing terminal carried by a user with a telephone terminal at a place visited by the user.

It is still another object of this invention to transfer a telephone call destined to a user to a telephone terminal at a place visited by the user by means of dynamic association.

It is yet another object of this invention to associate an information processing terminal with a telephone terminal by a simple operation.

CTI systems according to this invention are as follows.

(1) A CTI system comprising a telephone terminal having an ID tag, a server-connected main unit for controlling the telephone terminal, and an information processing terminal having an ID reader and a communication unit for communicating with the server-connected main unit;

the ID reader of the information processing terminal reading, as readout information, ID information out of the ID tag of the telephone terminal in a non-contact manner by positioning the ID reader of the information processing terminal and the ID tag of the telephone terminal in close proximity to each other;

the information processing terminal sending the readout information to the server-connected main unit by the communication unit;

the server-connected main unit associating the information processing terminal and the telephone terminal with each other with reference to the readout information;

the server-connected main unit being responsive to a request of the information processing terminal and carrying out call control for the telephone terminal associated with the information processing terminal.

(2) A CTI system according to (1), wherein:
the ID tag is an RFID tag;
the ID reader being for reading, as the readout information, RFID information out of the RFID tag.

(3) A CTI system according to (1), wherein:
the ID tag is a bar code ID tag;
the ID reader being for reading, as the readout information, bar code ID information out of the bar code ID tag.

(4) A CTI system according to (1), wherein:
the server-connected main unit transfers, to the telephone terminal associated with the information processing terminal, an incoming call destined to a possessor of the information processing terminal.

(5) A CTI system according to (1), wherein:
the server-connected main unit requests the information processing terminal to permit cancellation of association between the information processing terminal and the telephone terminal after lapse of a predetermined time period, the server-connected main unit canceling the association in response to a permission notice from the information processing terminal.

(6) A CTI system according to (1), wherein:
the server-connected main unit cancels association between the information processing terminal and the telephone terminal by again positioning the ID reader of the information processing terminal and the ID tag of the telephone terminal in close proximity to each other.

(7) A CTI system according to (1), wherein:
by positioning an ID reader of a different information processing terminal and the telephone terminal in proximity to each other, the server-connected main unit cancels association between the information processing terminal and the telephone terminal and establishes association between the different information processing terminal and the telephone terminal.

(8) A CTI system according to (1), wherein:
the information processing terminal makes a display unit of the telephone terminal associated therewith display specified information.

(9) A CTI system comprising a telephone terminal having an RFID tag, a server-connected main unit for controlling the telephone terminal, and an information processing terminal having an RFID reader and a communication unit for communicating with the server-connected main unit;
the FFID reader of the information processing terminal reading, as readout information, RFID information out of the RFID tag of the telephone terminal in a non-contact manner by positioning the RFID reader of the information processing terminal and the RFID tag of the telephone terminal in close proximity to each other;
the information processing terminal sending the readout information to the server-connected main unit by the communication unit;
the server-connected main unit associating the information processing terminal and the telephone terminal with each other with reference to the readout information;
the server-connected main unit being responsive to a request of the information processing terminal and carrying out call control for the telephone terminal associated with the information processing terminal;
the server-connected main unit transferring, to the telephone terminal associated with the information processing terminal, an incoming call destined to a possessor of the information processing terminal.

(10) A CTI system comprising a telephone terminal having an optical ID tag, a server connected main unit for controlling the telephone terminal, and an information processing terminal having an optical ID reader and a communication unit for communicating with the server-connected main unit;
the optical ID reader of the information processing terminal reading, as readout information, optical ID information out of the optical ID tag of the telephone terminal in a non-contact manner by positioning the optical ID reader of the information processing terminal and the optical ID tag of the telephone terminal in close proximity to each other;
the information processing terminal sending the readout information to the server-connected main unit by the communication unit;
the server-connected main unit associating the information processing terminal and the telephone terminal with each other with reference to the readout information;
the server-connected main unit being responsive to a request of the information processing terminal and carrying out call control for the telephone terminal associated with the information processing terminal.

(11) A CTI system comprising a telephone terminal having an ID reader, a server-connected main unit for controlling the telephone terminal, and an information processing terminal having an ID tag;
the ID reader of the telephone terminal reading, as readout information, ID information out of the ID tag of the information processing terminal in a non-contact manner by positioning the ID tag of the information processing terminal and the ID reader of the telephone terminal in close proximity to each other;
the telephone terminal sending the readout information to the server-connected main unit;
the server-connected main unit associating the information processing terminal and the telephone terminal with each other with reference to the readout information;
the server-connected main unit being responsive to a request of the information processing terminal and carrying out call control for the telephone terminal associated with the information processing terminal.

(12) A CTI system according to (11), wherein:
the ID tag is an RFID tag;
the ID reader being for reading, as the readout information, RFID information out of the RFID tag.

(13) A CTI system according to (11), wherein:
the ID tag is a bar code ID tag;
the ID reader being for reading, as the readout information, bar code ID information out of the bar code ID tag.

(14) A CTI system according to (11), wherein:
the server-connected main unit transfers, to the telephone terminal associated with the information processing terminal an incoming call destined to a possessor of the information processing terminal.

(15) A CTI system according to (11), wherein:
the server connected main unit requests the information processing terminal to permit cancellation of association between the information processing terminal and the telephone terminal after lapse of a predetermined time period, the server-connected main unit canceling the association in response to a permission notice from the information processing terminal.

(16) A CTI system according to (11), wherein:
the server-connected main unit cancels association between the information processing terminal and the telephone terminal by again positioning the ID tag of the information processing terminal and the ID reader of the telephone terminal in proximity to each other.

(17) A CTI system according to (11), wherein:
by positioning an ID tag of a different information processing terminal and the ID reader of the telephone terminal in proximity to each other, the server-connected main unit cancels association between the information processing terminal and the telephone terminal and establishes association between the different information processing terminal and the telephone terminal.

(18) A CTI system according to (11), wherein:
the information processing terminal makes a display unit of the telephone terminal associated therewith display specified information.

(19) A CTI system comprising a telephone terminal having an RFID reader, a server-connected main unit for controlling the telephone terminal, and an information processing terminal having an ID tag;
the RFID reader of the telephone terminal reading, as readout information, RFID information out of the RFID tag of the information processing terminal in a non-contact manner by positioning the RFID tag of the information processing terminal and the RFID reader of the telephone terminal in close proximity to each other;
the telephone terminal sending the readout information to the server-connected main unit;
the server-connected main unit associating the information processing terminal and the telephone terminal with each other with reference to the readout information;

the server-connected main unit being responsive to a request of the information processing terminal and carrying out call control for the telephone terminal associated with the information processing terminal;

the server-connected main unit transferring, to the telephone terminal associated with the information processing terminal, an incoming call destined to a possessor of the information processing terminal.

(20) A CTI system comprising a telephone terminal having an optical ID reader, a server-connected main unit for controlling the telephone terminal, and an information processing terminal having an optical ID tag;

the optical ID reader of the telephone terminal reading, as readout information, optical ID information out of the optical ID tag of the information processing terminal in a non-contact manner by positioning the optical ID tag of the information processing terminal and the optical ID reader of the telephone terminal in close proximity to each other;

the telephone terminal sending the readout information to the server-connected main unit;

the server-connected main unit associating the information processing terminal and the telephone terminal with each other with reference to the readout information;

the server-connected main unit being responsive to a request of the information processing terminal and carrying out call control for the telephone terminal associated with the information processing terminal.

According to this invention, it is possible to dynamically associate an information processing terminal and a telephone terminal.

According to this invention, it is possible to associate an information processing terminal carried by a user with a telephone terminal at a place visited by the user.

According to this invention, it is possible to transfer a telephone call destined to a user to a telephone terminal at a place visited by the user by means of dynamic association.

According to this invention, it is possible to associate an information processing terminal and a telephone terminal in a non-contact manner by positioning the information processing terminal and the telephone terminal in proximity to each other. Therefore, it is unnecessary to carry out a troublesome operation of, for example, directly operating a main unit or operating the information processing terminal.

DESCRIPTION OF THE PREFERRED EMBODIMENTS

Figure 1:
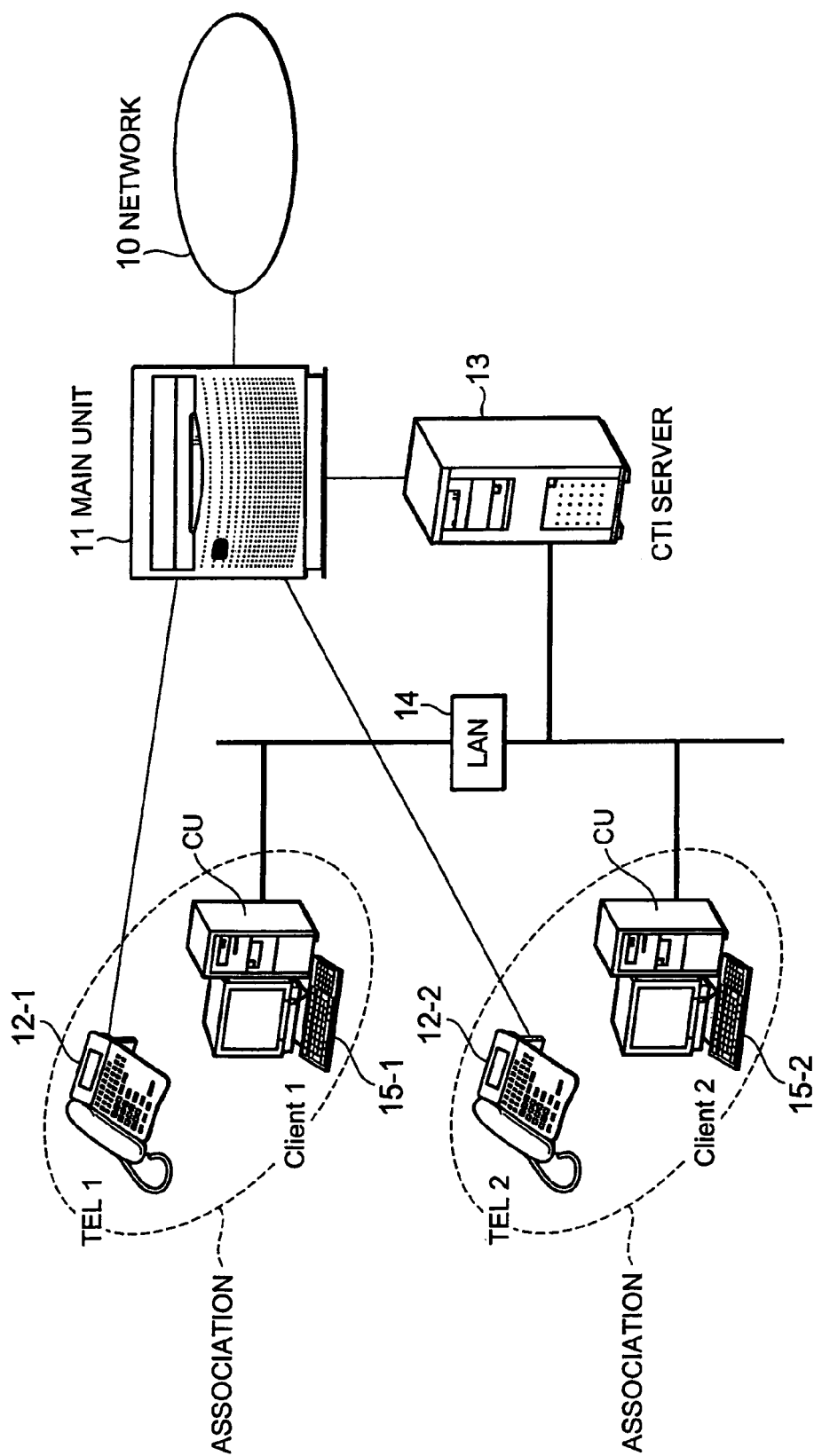
FIG. 1 is a block diagram of a related CTI system as a basis of this invention.

Now, description will be made of several preferred embodiments of this invention with reference to the drawing.

Figure 2:
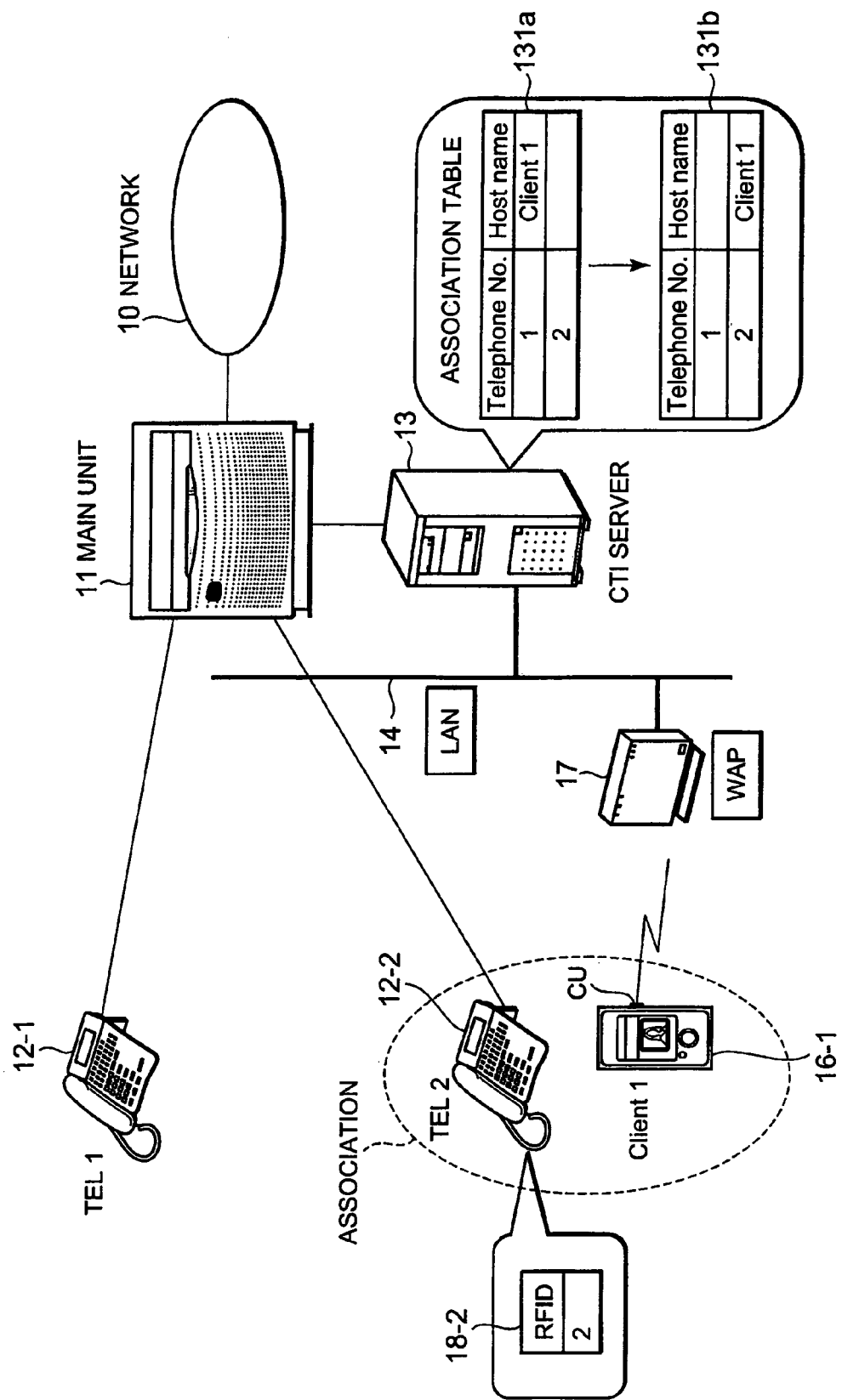
FIG. 2 is a view showing a CTI system according to a first embodiment of this invention.

Referring to FIG. 2, a CTI system according to a first embodiment of this invention is similar in structure to the CTI system illustrated in FIG. 1 and comprises a main unit (exchange) 11 connected to a network 10 (which is typically, a telephone network (external line)), first and second telephone terminals (TEL1 and TEL2) 12-1 and 12-2 connected to the main unit 11, a CTI server (computer) 13 connected to the main unit 11, and a LAN (Local Area Network) 14 connected to the CTI server 13.

In this invention, a combination of the main unit 11 and the CTI server 13 connected thereto is referred to as a server-connected main unit.

The CTI system illustrated in FIG. 2 further comprises a portable PDA (Personal Digital Assistant) as a first information processing terminal (client 1) 16-1 and a WAP (Wireless Access Point) 17 connected to the LAN 14 to enable radio connection between the PDA and the LAN 14. The PDA as the first information processing terminal (client 1) 16-1 has a communication unit CU for communicating with the CTI server 13 of the main unit 11 through the WAP 17 and the LAN 14.

Referring to FIG. 2, it is assumed that the first telephone terminal (TEL1) 12-1 is assigned to a possessor of the client 1 (PDA) 16-1 and that the possessor of the client 1 (PDA) 16-1 carries the client 1 (PDA) 16-1 and moves away from the first telephone terminal 12-1 to a position near the second telephone terminal 12-2.

As described above, the first telephone terminal (TEL1) 12-1 is assigned to the possessor of the client 1 (PDA) 16-1. Therefore, in a setting information table 131a in an association table 131 in the CTI server 13, the client 1 (PDA) 16-1 represented by a host name is preliminarily associated with a telephone number "1" of the first telephone terminal (TEL1) 12-1. Specifically, the setting information table 131a registers, as the setting information, the host name as ID data of the client 1 (PDA) 16-1 in association with the telephone number as ID data of the first telephone terminal (TEL1) 12-1.

Herein, the second telephone terminal (TEL2) 12-2 is provided with an RFID (Radio Frequency Identification) tag 18-2 representing that an RFID is "2" (=telephone number).

Figure 3:
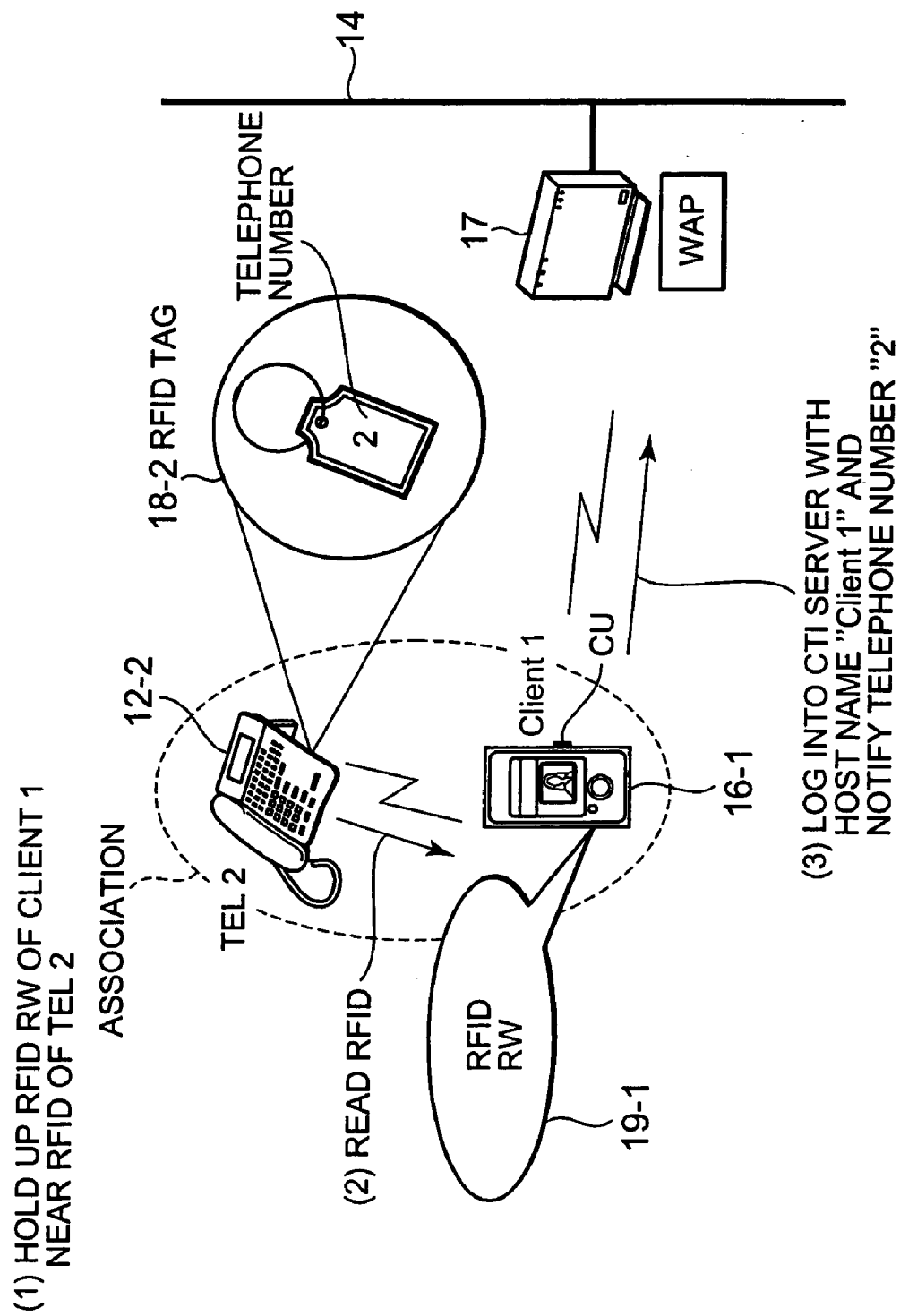
FIG. 3 is a view for describing an operation of the CTI system according to the first embodiment of this invention.

Referring to FIG. 3, the client 16-1 has an RFID reader/writer (RFID RW) 19-1.

In FIG. 3, the following operation is carried out.

(1) The possessor of the client 16-1 holds up the RFID reader/writer 19-1 of the client 16-1 close to the RFID tag 18-2 of the second telephone terminal 12-2.

(2) The RFID reader/writer 19-1 of the client 16-1 reads the RFID ("2"=telephone number) of the RFID tag 18-2 of the second telephone terminal 12-2.

(3) The RFID reader/writer 19-1 of the client 16-1 logs into the CTI server 13 (FIG. 2) through the WAP 17 and the LAN 14 with the client 1 as the host name, and informs the telephone number "2".

Turning back to FIG. 2, the CTI server 13 has a change information table 131b in the association table 131. The CTI server 13 makes the change information table 131b in the association table 131 store, as change information, the client 1 as the host name in association with the telephone number "2" of the second telephone terminal 12-2.

In FIG. 2, registration of the setting information (including the host name of the client 1 (PDA) 16-1 and the telephone number of the first telephone terminal (TEL1) 12-1) into the setting information table 131a in the association table 131 in the CTI server 13 may be carried out in the manner similar to the registration of the change information (including the client 1 as the host name and the telephone number "2" of the second telephone terminal 12-2) into the change information table 131b in the association table 131. In this case, the registration is carried out in the following manner. The first telephone terminal 12-1 is provided with an RFID tag representing that an RFID is "1" (=telephone number). The possessor of the client 16-1 holds up the RFID reader/writer of the client 16-1 close to the RFID tag of the first telephone terminal 12-1.

In order to preliminarily write the RFID="2" (=telephone number) into the RFID tag 18-2 of the second telephone terminal 12-2, any information processing terminal having an RFID reader/writer (RFID RW) is used. The RFID reader/writer of the information processing terminal writes into the RFID tag 18-2 the information RFID="2" (=telephone number) related to the second telephone terminal 12-2 and acquired from the main unit 11. In this case, the RFID is not restricted to the telephone number of the second telephone terminal 12-2 but may be any other information related to the second telephone terminal 12-2.

Figure 4:
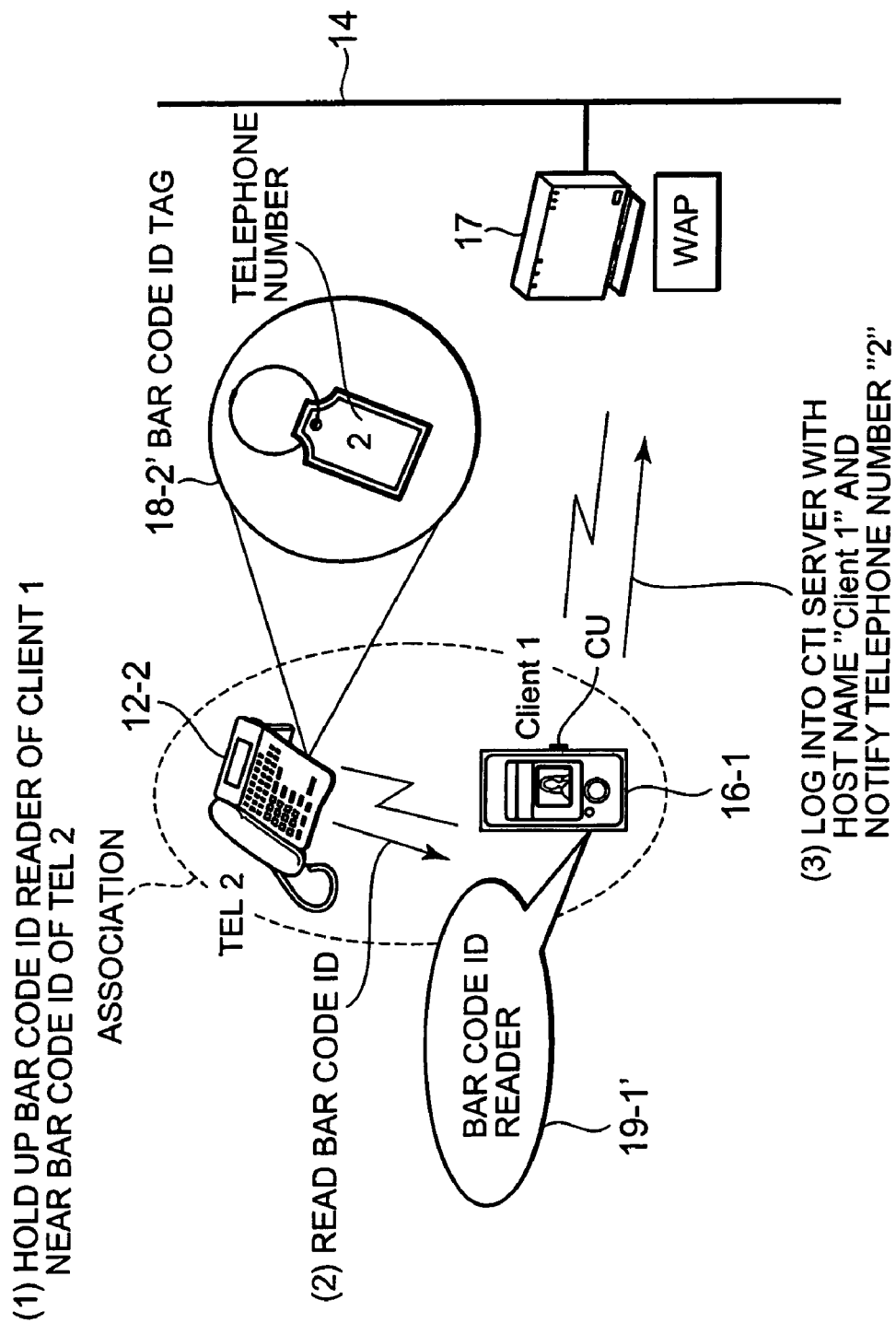
FIG. 4 is a view for describing an operation of a modification of the CTI system according to the first embodiment of this invention.
Figure 5:
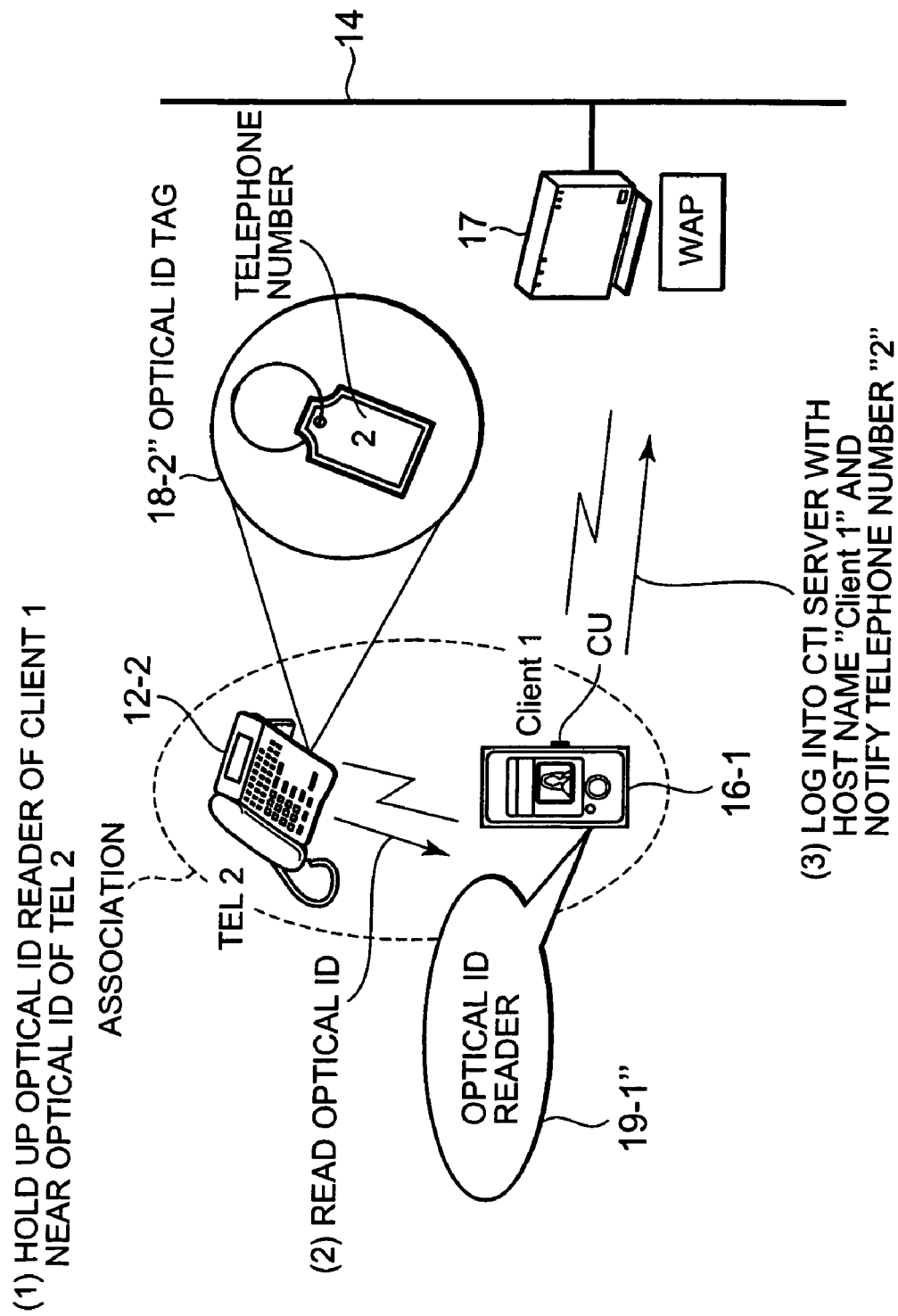
FIG. 5 is a view for describing an operation of another modification of the CTI system according to the first embodiment of this invention.

In FIG. 3, the RFID tag 18-2 representing that the RFID is "2" (=telephone number) may be replaced by a bar code ID tag 18-2' (FIG. 4) representing that a bar code ID is "2" (=telephone number) and attached to the second telephone terminal 12-2. In this case, the client 16-1 is provided with a bar code ID reader 19-1' (FIG. 4) for optically reading the bar code ID, instead of the RFID reader/writer 19-1. Alternatively, use may be made of a combination of an optical ID tag 18-2" (FIG. 5) having an optical ID (for example, a two-dimensional code ID) other than the bar code ID and an optical ID reader 19-1" (FIG. 5) for reading the optical ID. Thus, any structure is applicable as far as the ID of the ID tag attached to the second telephone terminal 12-2 is read by the ID reader of the client 16-1.

Next referring to FIG. 6, description will be made of a still another modification of the CTI system according to the first embodiment mentioned above. In this modification, the client 16-1 is provided with an RFID tag 18-1 having a MAC (Media Access Control) address of the client 16-1 as the RFID. The second telephone terminal 12-2 has an RFID reader/writer 19-2.

Figure 6:
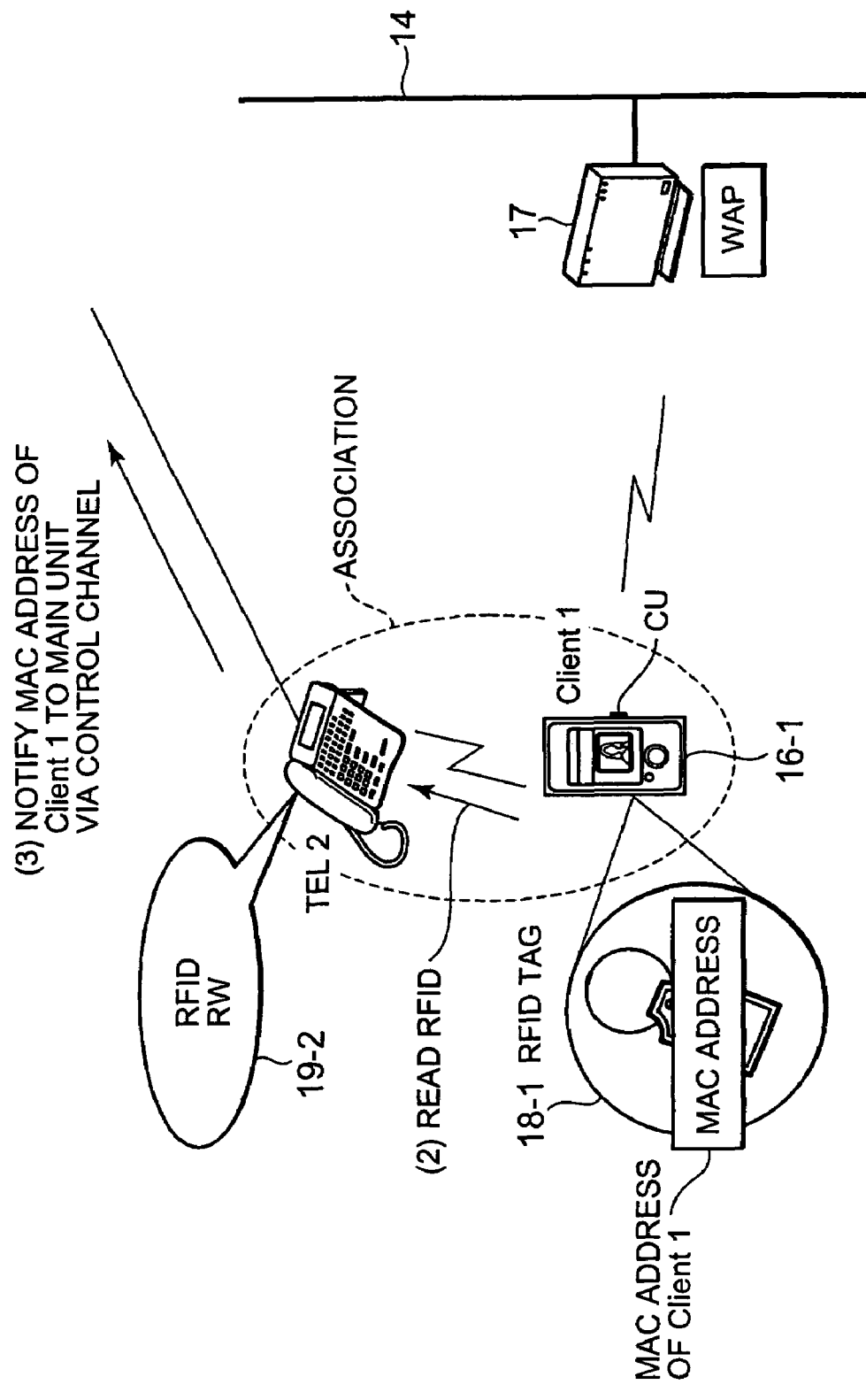
FIG. 6 is a view for describing an operation of still another modification of the CTI system according to the first embodiment of this invention.

Referring to FIG. 6, the following operation is carried out.

(1) The possessor of the client 16-1 holds up the RFID tag 18-1 of the client 16-1 close to the RFID reader/writer 19-2 of the second telephone terminal 12-2.

(2) The RFID reader/writer 19-2 of the second telephone terminal 12-2 reads the RFID (MAC address of the client 16-1) of the RFID tag 18-1 of the client 16-1.

(3) The second telephone terminal 12-2 informs the RFID (MAC address of the client 16-1) read by the RFID reader/writer 19-2 to the main unit 11 (FIG. 2) through a control channel.

In this case, in FIG. 2, the main unit 11 makes the change information table 131b in the association table 131 of the CTI server 13 store, as change information, the MAC address of the client 16-1 informed from the second telephone terminal 12-2 in association with the telephone number "2" of the second telephone terminal 12-2 which has informed the MAC address of the client 16-1.

Registration of the setting information into the setting information table 131a in the association table 131 in the CTI server 13 may be carried out in the manner similar to the registration of the change information into the change information table 131b in the association table 131 in the above-mentioned modification. In this case, the registration is carried out in the following manner. The first telephone terminal 12-1 is provided with an RFID reader/writer. The possessor of the client 16-1 holds up the RFID tag 18-1 of the client 16-1 close to the RFID reader/writer of the first telephone terminal 12-1.

In order to preliminarily write the RFID (MAC address of the client 16-1) into the RFID tag 18-1 of the client (information processing terminal) 16-1, any telephone terminal having an RFID reader/writer (RFID RW) is used. The RFID reader/writer of the telephone terminal writes into the RFID tag 18-1 the information RFID (MAC address of the client 16-1) related to the client 16-1 and acquired from the main unit 11. In this case, the RFID is not restricted to the MAC address of the client 16-1 but may be any other information related to the client 16-1.

Figure 7:
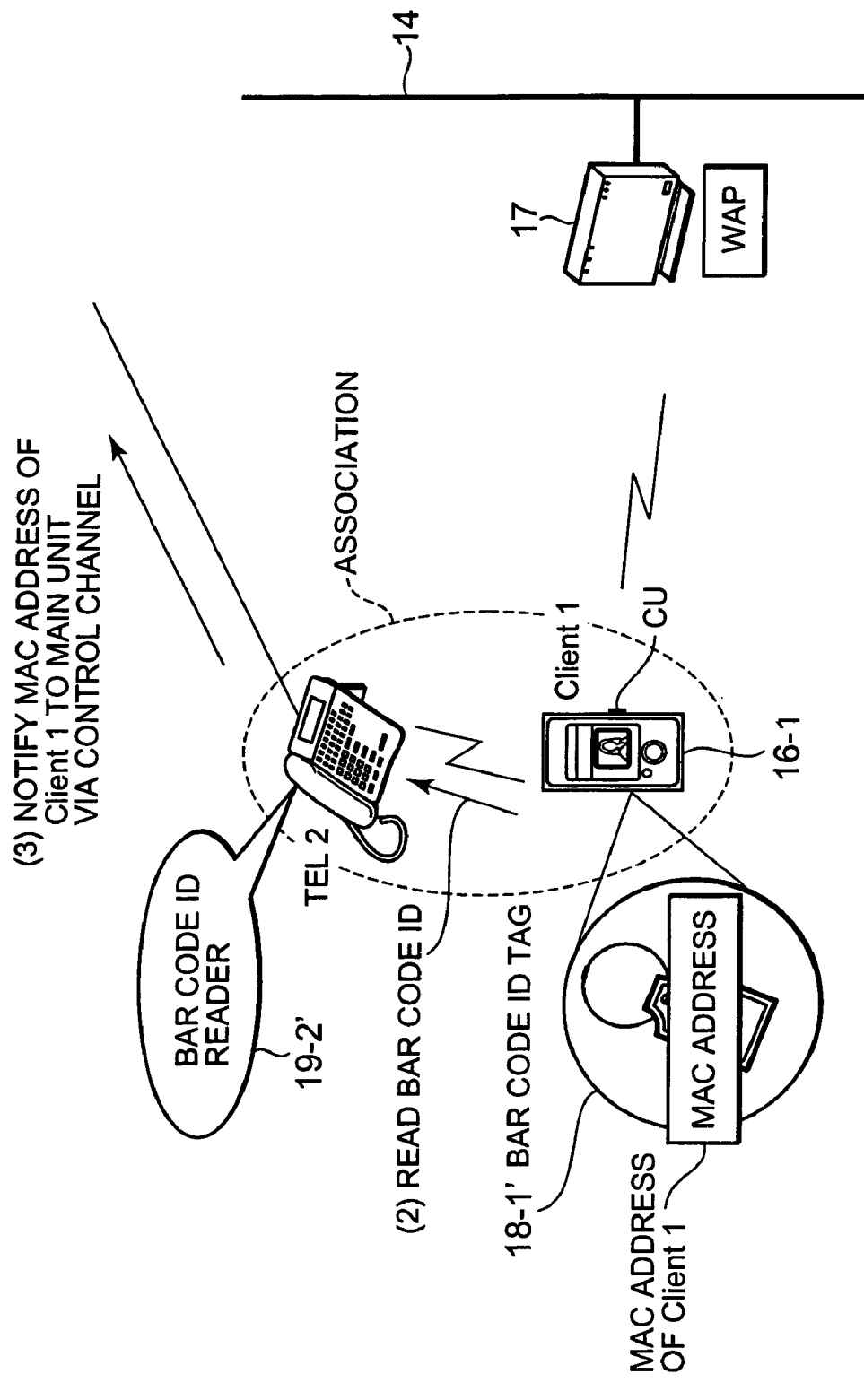
FIG. 7 is a view for describing an operation of a further modification of the CTI system according to the first embodiment of this invention.
Figure 8:
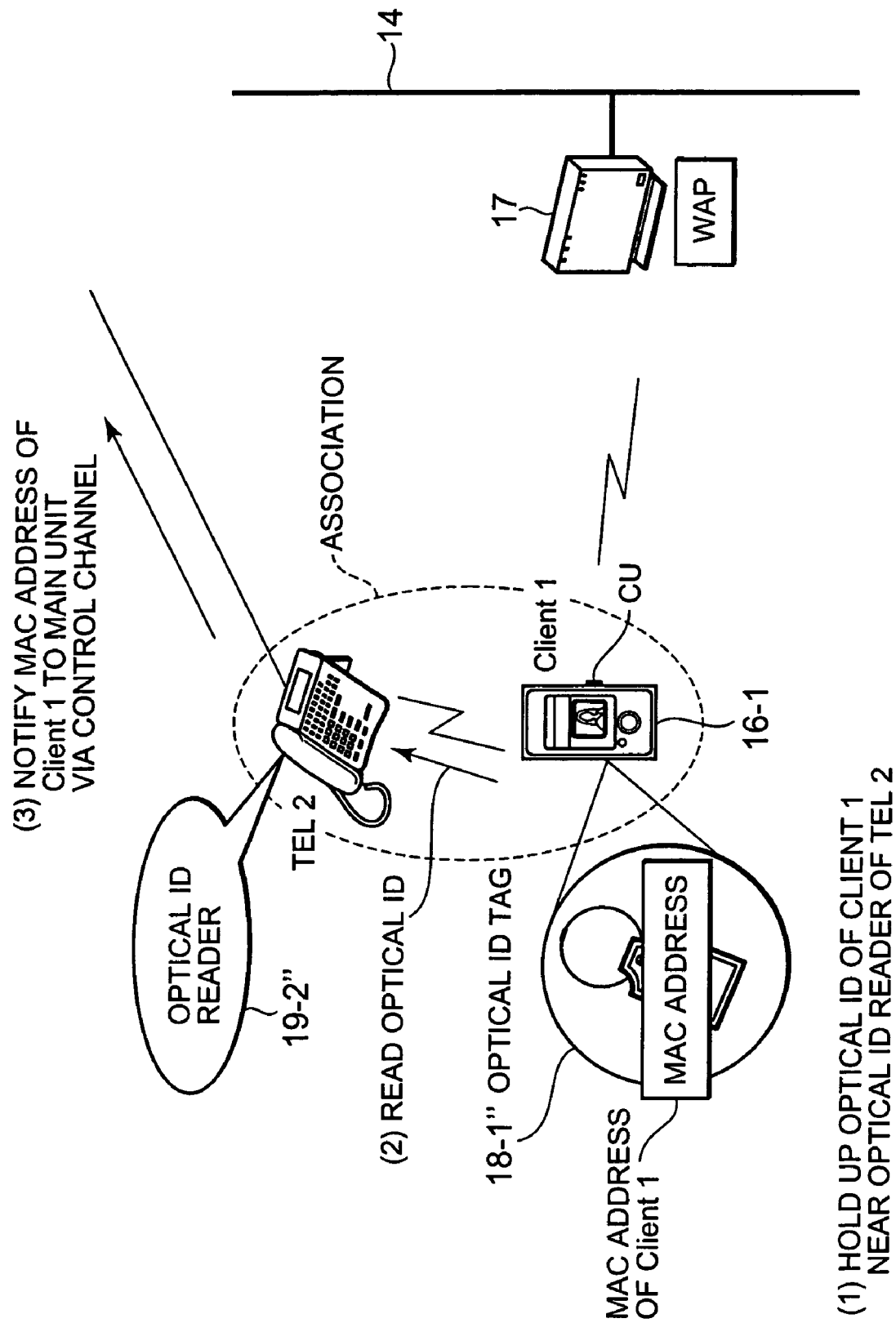
FIG. 8 is a view for describing an operation of a still further modification of the CTI system according to the first embodiment of this invention.

In FIG. 6, the RFID tag 18-1 including the RFID representing the MAC address of the client 16-1 may be replaced by a bar code ID tag 18-1' (FIG. 7) which includes a bar code ID representing the MAC address of the client 16-1 and which is attached to the client 16-1. In this case, the second telephone terminal 12-2 is provided with a bar code ID reader 19-2' (FIG. 7) for optically reading the bar code ID, instead of the RFID reader/writer 19-2. Alternatively, use may be made of a combination of an optical ID tag 18-1" (FIG. 8) having an optical ID (for example, a two-dimensional code ID) other than the bar code ID and an optical ID reader 19-2" (FIG. 8) for reading the optical ID. Thus, any structure is applicable as far as the ID of the ID tag attached to the client 16-1 is read by the ID reader of the second telephone terminal 12-2.

In each of the first embodiment (FIG. 3) and the modifications (FIGS. 4-8), the change information is stored in the change information table 131b in the association table 131 to establish the association as shown in FIG. 2. Therefore, in response to a request (request for call origination, response, disconnection, or the like) of the client 16-1 as the information processing terminal, the main unit 11 can carry out control (call control for call origination, response, disconnection, or the like) for the second telephone terminal 12-2 associated with the client 16-1.

Thus, the information processing terminal 16-1 can carry out call control for call origination, response, disconnection, or the like for the second telephone terminal 12-2 associated therewith. In other words, the information processing terminal 16-1 can carry out call control for the second telephone terminal 12-2 at a place visited by the possessor carrying the information processing terminal 16-1.

Further, the information processing terminal 16-1 can make a display unit of the second telephone terminal 12-2 display specified information.

Figure 9:
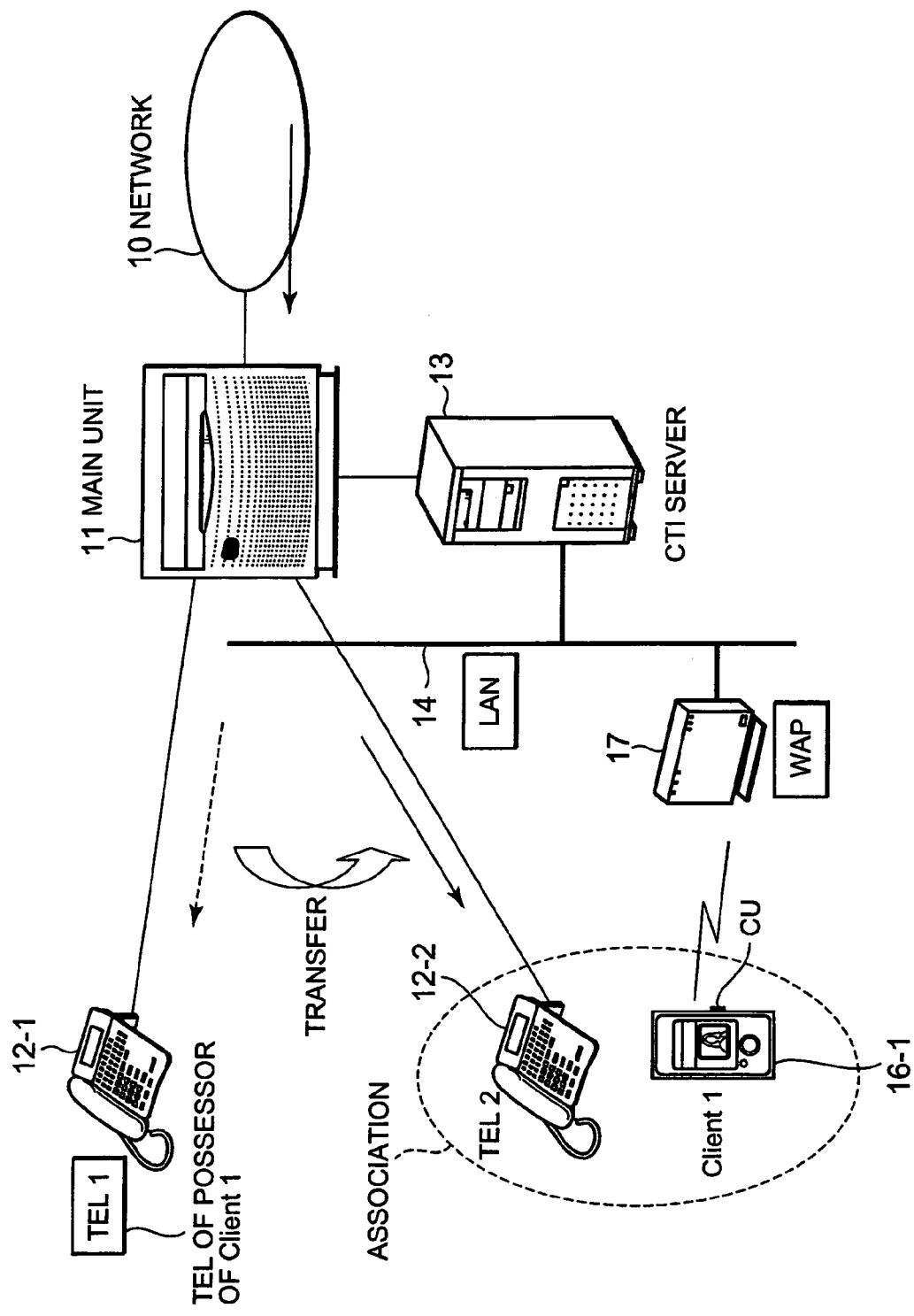
FIG. 9 is a view for describing a call transfer operation in the CTI system according to the first embodiment of this invention.

Next referring to FIG. 9, description will be made of a call transfer (call redirection) operation by the CTI system according to the first embodiment. In FIG. 9, it is assumed that the possessor of the client 1 (PDA) 16-1 carries the client 1 (PDA) 16-1 and moves away from the first telephone terminal 12-1 assigned to the possessor to a position near the second telephone terminal 12-2 and that the change information table 131b (FIG. 2) in the CTI server 13 stores the change information about the association of the client 1 (PDA) 16-1.

Specifically, it is assumed that the CTI sever 13 has, in the association table 131, the setting information table 131a and the change information table 131b storing the setting information and the change information as shown in FIG. 2, respectively.

Referring to FIG. 9 in addition to FIG. 2, in this event, the main unit 11 refers to the association table 131 in the CTI server 13 upon reception of a call destined to the first telephone terminal 12-1 assigned to the possessor of the client 16-1.

With reference to the setting Information table 131a and the change information table 131b in the association table 131, the main unit 11 knows that the association of the client 16-1 is changed from the first telephone terminal 12-1 into the second telephone terminal 12-2. Therefore, the call destined to the client 16-1 is not sent to the first telephone terminal 12-1 but is sent to the second telephone terminal 12-2. Since the possessor of the client 16-1 is present near the second telephone terminal 12-2, the possessor of the client (PDA) 16-1 can respond to the call.

Referring to FIGS. 2 and 9, it is assumed that the possessor of the client 1 (PDA) 16-1 carries the client 1 (PDA) 16-1 and further moves away from the second telephone terminal 12-2 to a position near a third telephone terminal (not shown) having a telephone number "3". It is also assumed that the possessor of the client 1 (PDA) 16-1 carries out an operation of changing the association of the client 1 (PDA) 16-1 to the telephone number "3" in the manner similar to the above-mentioned operation of changing the association of the client 1 (PDA) 16-1 to the telephone number "2". In this case, change information representing the association between the client 1 as a host name and the telephone number "3" of the third telephone terminal is written in the change information table 131b in the CTI server 13 to overwrite the change information previously stored. With reference to the change information table 131b, the main unit 11 knows that the client 16-1 is associated with the third telephone terminal having the telephone number "3". Therefore, the call destined to the client 16-1 is not sent to the telephone terminal 12-1 but is sent to the third telephone terminal having the telephone number "3".

Referring to FIG. 2, description will be made of methods for canceling the association.

First Canceling Method

The main unit 11 requests the information processing terminal 16-1 to permit cancellation of association after lapse of a predetermined time period. In response to a permission notice from the information processing terminal 16-1, the association is canceled. Specifically, the main unit 11 erases the change information in the change information table 131b in the association table 131 to cancel the association.

Second Canceling Method

By arranging the information processing terminal 16-1 and the second telephone terminal 12-2 in proximity to each other again, the main unit 11 cancels the association between the information processing terminal 16-1 and the second telephone terminal 12-2. Specifically, the main unit 11 erases the change information in the change information table 131b in the association table 131 to cancel the association.

Third Canceling Method

By arranging a different information processing terminal and the second telephone terminal 12-2 in proximity to each other, the main unit cancels the association between the information processing terminal 16-1 and the second telephone terminal 12-2. Specifically, the main unit 11 erases the change information in the change information table 131b in the association table 131 to cancel the association. Then, the main unit 11 establishes association between the different information processing terminal and the second telephone terminal 12-2. In this case, change information representing the association between the different information processing terminal and the second telephone terminal 12-2 is stored in a change information table in a different association table for the different information processing terminal.

Next referring to FIG. 10, description will be made of a CTI system according to a second embodiment of this invention and a call transfer operation in the CTI system according to the second embodiment.

Figure 10:
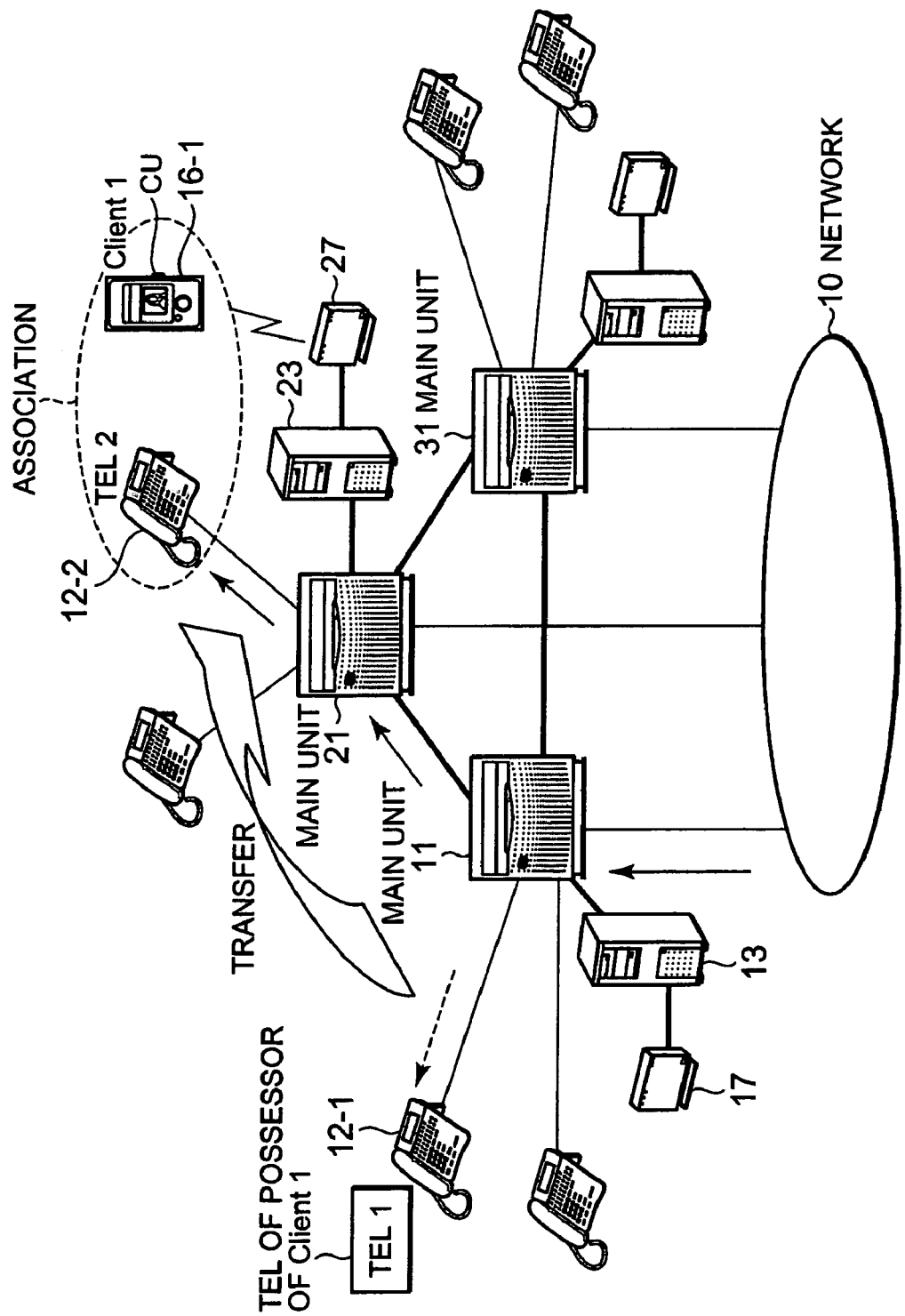
FIG. 10 is a view showing a CTI system according to a second embodiment of this invention.

In FIG. 10, the CTI system according to the second embodiment includes similar parts designated by like reference numerals as those in the first embodiment illustrated in FIGS. 2 and 9. The CTI system according to the second embodiment further comprises a main unit 21 connected to the main unit 11 via a private line and a main unit 31 connected to the main unit 11 via a private line. The main units 21 and 31 are connected via a private line also. Thus, the three main units 11, 21, and 31 connected by the private lines to one another form a main unit assembly of a large scale. Each of the main units 11, 21, and 31 is connected to the network 10 (which is typically, a telephone network (external line)). The network 10 may be an IP (Internet Protocol) network.

The main unit 21 is connected to a CTI server 23. The CTI server 23 is connected to a WAP 27. Similarly, the main unit 31 is connected to another CTI server which is connected to another WAP.

In the above-mentioned CTI system, it is assumed that the possessor of the client 1 (PDA) 16-1 carries the client 1 (PDA) 16-1 and moves away from the first telephone terminal 12-1 (having the telephone number "1") assigned to the possessor to a position near the second telephone terminal 12-2 (having the telephone number "2"). The client 1 (PDA) 16-1 reads the telephone number "2" of the second telephone terminal 12-2 from the RFID tag of the second telephone terminal 12-2. The change information representing the association between the telephone number "2" of the second telephone terminal 12-2 read as mentioned above and the client 1 as the host name of the client 1 (PDA) 16-1 is stored in the change information table in the CTI server 13 through the WAP 27, the CTI server 23, the main unit 21, and the main unit 11.

More in detail, the CTI server 13 in FIG. 10 also has, in the association table 131, the setting information table 131a storing the setting information and the change information table 131b storing the change information as illustrated In FIG. 2.

Referring to FIG. 10 together with the association table 131 in FIG. 2, the main unit 11 refers to the association table 131 in the CTI server 13 upon reception of a call destined to the first telephone terminal 12-1 assigned to the possessor of the client 16-1.

With reference to the setting information table 131a and the change information table 131b in the association table 131, the main unit 11 knows that the association of the client 16-1 is changed from the first telephone terminal 12-1 to the second telephone terminal 12-2. Therefore, the main unit 11 does not send the call destined to the client 16-1 to the first telephone terminal 12-1 but sends the call to the second telephone terminal 12-2 through the main unit 21. Since the possessor of the client 16-1 is present near the second telephone terminal 12-2, the possessor of the client 16-1 can respond to the call.

Figure 11:
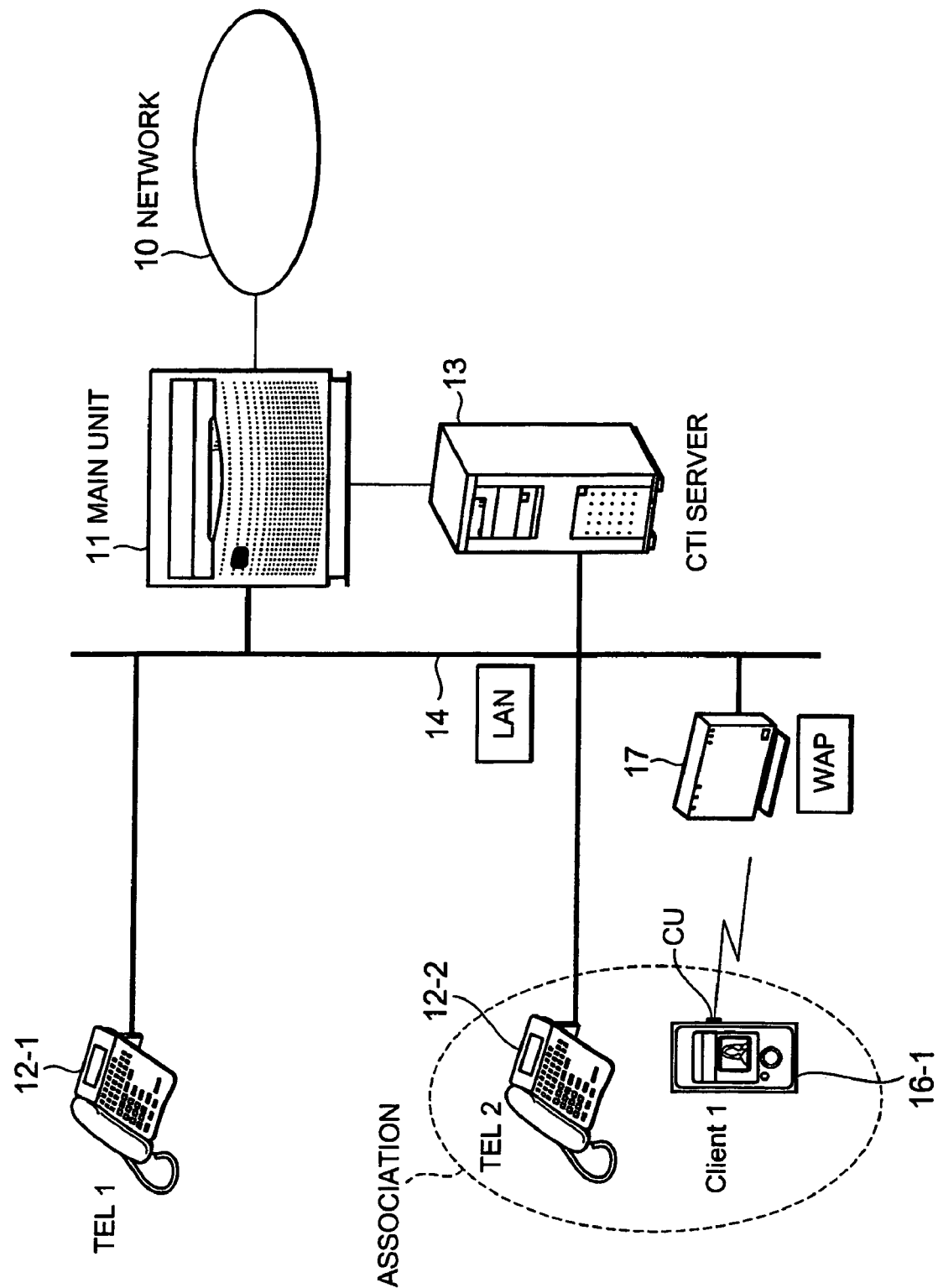
FIG. 11 is a view showing a CTI system according to a third embodiment of this invention.

Referring to FIG. 11, a CTI system according to a third embodiment of this invention is similar to the CTI system in FIG. 2 except that each of the first and the second telephone terminals 12-1 and 12-2 is an IP (Internet Protocol) telephone connected to the LAN 14 and that the network 10 is an IP network. Thus, in this CTI system also, the second telephone terminal 12-2 is associated with the client (PDA) 16-1 like in the CTI system in FIG. 2. The CTI server 13 stores the setting information in the setting information table 131a and the change information in the change information table 131b in FIG. 2.

Figure 12:
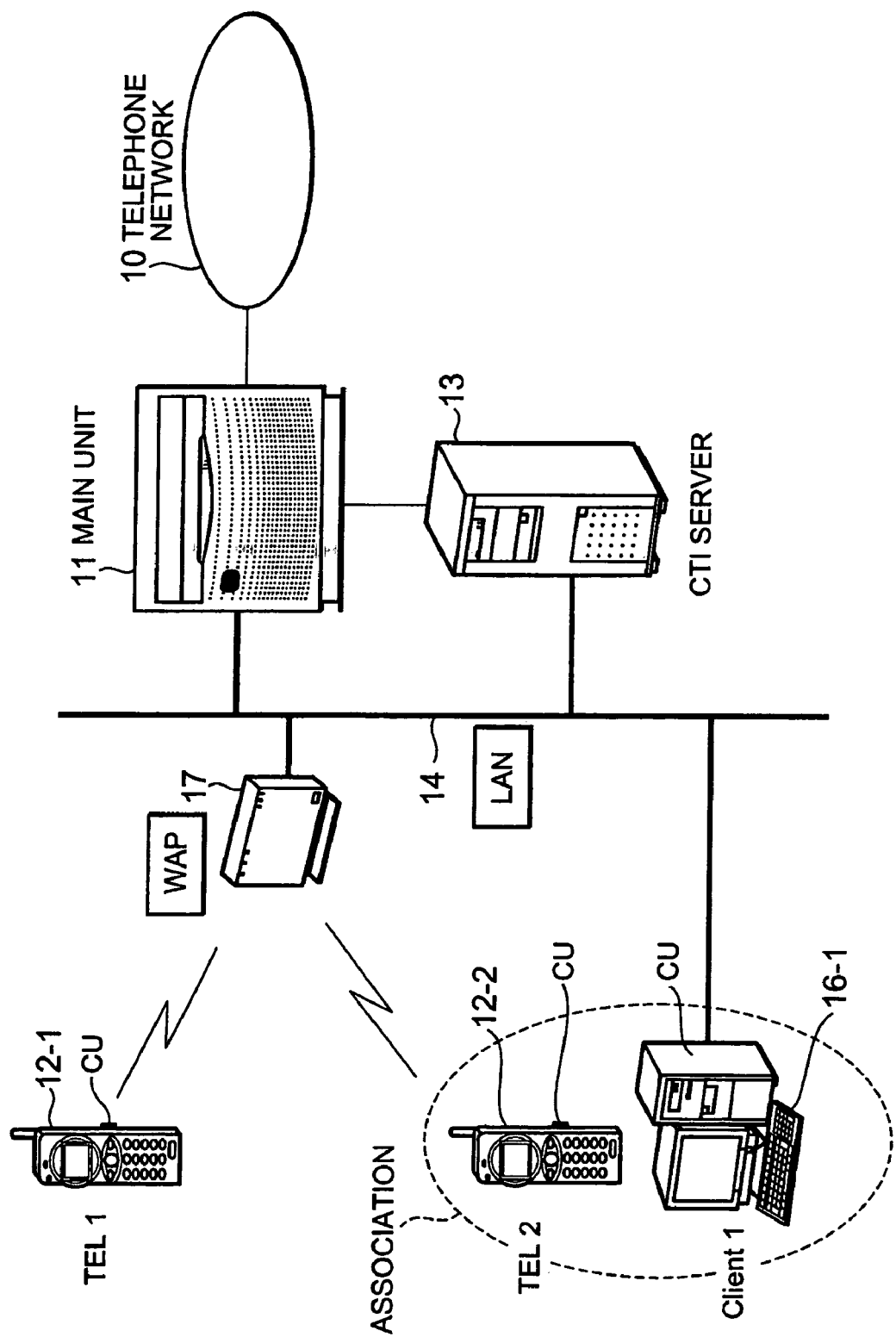
FIG. 12 is a view showing a CTI system according to a fourth embodiment of this invention.

Referring to FIG. 12, a CTI system according to a fourth embodiment of this invention has, as the first and the second telephone terminals 12-1 and 12-2, wireless LAN terminals connected via the WAP 17 to the LAN 14 and, as the information processing terminal (client 1) 16-1, a personal computer (PC) connected to the LAN 14. In this CTI system also, the second telephone terminal (wireless LAN terminal) 12-2 having the telephone number "2" is associated with the client 1 (PC) 16-1, like in the CTI system in FIG. 2. The CTI server 13 stores the setting information in the setting information table 131a and the change information in the change information table 131b in FIG. 2.

In this embodiment also, the change information is stored in the CTI server 13 and association is established so that the main unit 11 can carry out control (call control such for call origination, response, disconnection, or the like) for the telephone terminal 12-2 associated with the client 16-1 (information processing terminal) in response to a request (request for call origination, response, disconnection, or the like) of the client 16-1 (information processing terminal).

Thus, the information processing terminal 16-1 can carry out call control such as call origination, response, disconnection, or the like for the telephone terminal 12-2 associated therewith.

Further, the second telephone terminal 12-2 can use the information processing terminal 16-1 as call control means for another telephone terminal.

While this invention has thus far been described in connection with the preferred embodiments thereof, it will be readily possible for those skilled in the art to put this invention into practice in various other manners without departing from the scope set forth in the appended claims.

What is claimed is:

1. A CTI system comprising a telephone terminal having an ID tag, a server-connected main unit for controlling said telephone terminal, and an information processing terminal having an ID reader and a communication unit for communicating with said server-connected main unit, the ID reader of said information processing terminal reading, as readout information, ID information out of the ID tag of said telephone terminal in a non-contact manner by positioning the ID reader of said information processing terminal and the ID tag of said telephone terminal in close proximity to each other;

said information processing terminal sending said readout in information said server-connected main unit by said communication unit;

said server-connected main unit associating, based on said readout information, said information processing terminal and said telephone terminal with each other in a setting information table embodied on said server-connected main unit, wherein said setting information table comprises a plurality of associations between information processing terminals and telephone terminals for the purpose of routing calls to the current location of the information processing terminals; and said server-connected main unit being responsive to a request of said information processing terminal for call origination, response, or disconnection of said telephone terminal and carrying out call control for the call origination, the response, or the disconnection based on said association between said telephone terminal and said information processing terminal stored in said setting information table.

2. A CTI system according to claim 1, wherein:

said ID tag is an RFID tag;

said ID reader being for reading, as said readout information, RFID information out of said RFID tag.

3. A CTI system according to claim 1, wherein:

said ID tag is a bar code ID tag;

said ID reader being for reading, as said readout information, bar code ID information out of said bar code ID tag.

4. A CTL system according to claim 1, wherein:

said server-connected main unit transfers, to said telephone terminal associated with said information processing terminal, an incoming call destined to a possessor of said information processing terminal.

5. A CTI system according to claim 1, wherein:

said server-connected main unit requests said information processing terminal to permit cancellation of association between said information processing terminal and said telephone terminal after lapse of a predetermined time period, said server-connected main unit canceling the association in response to a permission notice from said information processing terminal.

6. A CTI system according to claim 1, wherein:

said server-connected main unit cancels association between said information processing terminal and said telephone terminal by again positioning the ID reader of said information processing terminal and the ID tag of said telephone terminal in close proximity to each other.

7. A CTI system according to claim 1, wherein:

by positioning an ID reader of a different information processing terminal and said telephone terminal in proximity to each other, said server-connected main unit cancels association between said information processing terminal and said telephone terminal and establishes association between said different information processing terminal and said telephone terminal.

8. A CTI system according to claim 1, wherein:

said information processing terminal makes a display unit of said telephone terminal associated therewith display specified information.

9. A CTI system comprising a telephone terminal having an RFID tag, a server-connected main unit for controlling said telephone terminal, and an information processing terminal having an RFID reader and a communication unit for communicating with said server-connected main unit, the RFID reader of said information processing terminal reading, as readout information, RFID information out of the RFID tag of said telephone terminal in a non-contact manner by positioning the RFID reader of said information processing terminal and the RFID tag of said telephone terminal in close proximity to each other;

said information processing terminal sending said readout information to said server-connected main unit by said communication unit;

said server-connected main unit associating, based on said readout information, said information processing terminal and said telephone terminal with each other in a setting information table embodied on said server-connected main unit, wherein said setting information table comprises a plurality of associations between information processing terminals and telephone terminals for the purpose of routing calls to the current location of the information processing terminals;

said server-connected main unit being responsive to a request of said information processing terminal for call origination, response, or disconnection of said telephone terminal and carrying out call control for the call origination, the response, or the disconnection based on said association between said telephone terminal and said information processing terminal stored in said setting information table; and said server-connected main unit transferring, to said telephone terminal associated with said information processing terminal, an incoming call intended for a possessor of said information processing terminal.

10. A CTI system comprising a telephone terminal having an optical ID tag, a server-connected main unit for controlling said telephone terminal, and an information processing terminal having an optical ID reader and a communication unit for communicating with said server-connected main unit, the optical ID reader of said information processing terminal reading, as readout information, optical ID information out of the optical ID tag of said telephone terminal in a non-contact manner by positioning the optical ID reader of said information processing terminal and the optical ID tag of said telephone terminal in close proximity to each other;

said information processing terminal sending said readout information to said server-connected main unit by said communication unit;

said server-connected main unit associating, based on said readout information, said information processing terminal and said telephone terminal with each other in a setting information table embodied on said sever-connected main unit, wherein said setting information table comprises a plurality of associations between information processing terminals and telephone terminals for the purpose of routing calls to the current location of the information processing terminals; and said server-connected main unit being responsive to a request of said information processing terminal for call origination, response, or disconnection of said telephone terminal and carrying out call control for the call origination, response, or the disconnection based on said association between said telephone terminal and said information processing terminal stored in said setting information table.

11. CTI system comprising a telephone terminal having an ID reader, a server-connected main unit for controlling said telephone terminal, and an information processing terminal having an ID tag, the ID reader of said telephone terminal reading, as readout information, ID information out of the ID tag of said information processing terminal in a non-contact manner by positioning the ID tag of said information processing terminal and the ID reader of said telephone terminal in close proximity to each other;

said telephone terminal sending said readout information to said server-connected main unit;

said server-connected main unit associating, based on said readout information said information processing terminal and said telephone terminal with each other in a setting information table embodied on said server-connected main unit, wherein said setting information table comprises a plurality of associations between information processing terminals and telephone terminals for the purpose of routing calls to the current location of the information processing terminals; and said server-connected main unit being responsive to a request of said information processing terminal for call origination, response, or disconnection of said telephone terminal and carrying out call control for the call origination, the response, or the disconnection based on said association between said telephone terminal and said information processing terminal stored in said setting information table.

12. A CTI system according to claim 11, wherein:
said ID tag is an RFID tag;
said ID reader being for reading, as said readout information, RFID information out of said RFID tag.

13. A CTI system according to claim 11, wherein:
said ID tag is a bar code ID tag;
said ID reader being for reading, as said readout information, bar code ID information out of the bar code ID tag.

14. A CTI system according to claim 11, wherein:
said server-connected main unit transfers, to said telephone terminal associated with said information processing terminal an incoming call destined to a possessor of said information processing terminal.

15. A CTI system according to claim 11, wherein:
said server-connected main unit requests said information processing terminal to permit cancellation of association between said information processing terminal and said telephone terminal after lapse of a predetermined time period, said serve-connected main unit canceling the association in response to a permission notice from said information processing terminal.

16. A CTI system according to claim 11, wherein;
said server-connected main unit cancels association between said information processing terminal and said telephone terminal by again positioning the ID tag of said information processing terminal and the ID reader of said telephone terminal in proximity to each other.

17. A CTI system according to claim 11, wherein:
by positioning an ID tag of a different information processing terminal and the ID reader of said telephone terminal in proximity to each other, said server-connected main unit cancels association between said information processing terminal and said telephone terminal and establishes association between said different information processing terminal and said telephone terminal.

18. A CTI system according to claim 11, wherein:
said information processing terminal makes a display unit of said telephone terminal associated therewith display specified information.

19. A CTI system comprising a telephone terminal having an RFID reader, a server-connected main unit for controlling said telephone terminal, and an information processing terminal having an ID tag, the RFID reader of said telephone terminal reading, as readout information, RFID information out of the RFID tag of said information processing terminal in a noncontact manner by positioning the RFID tag of said information processing terminal and the RFID reader of said telephone terminal in close proximity to each other;

said telephone terminal sending said readout information to said server-connected main unit;

said server-connected main unit associating, based on said readout information, said information processing terminal and said telephone terminal with each other in a setting information table embodied on said server-connected main unit, wherein said information table rises a plurality of associations between information processing terminals and telephone terminals for the purpose of routing calls to the current location of the information processing terminals;

said server-connected main unit being responsive to a request of said information processing terminal for call origination, response, or disconnection of said telephone terminal and carrying out call control for the call origination, the response, or the disconnection based on said association between said telephone terminal and said information processing terminal stored in said setting information table; and said server-connected main unit transferring, to said telephone terminal associated with said information processing terminal, an incoming call intended for a possessor of said information processing terminal.

20. A CTI system comprising a telephone terminal having an optical ID reader, a server-connected main unit for controlling said telephone terminal, and an information processing terminal having an optical ID tag, the optical ID reader of said telephone terminal reading, as readout information, optical ID information out of the optical ID tag of said information processing terminal in a non-contact manner by positioning the optical ID tag of said information processing terminal and the optical ID reader of said telephone terminal in close proximity to each other;

said telephone terminal sending said readout information to said server-connected main unit;

said server-connected main unit associating, based on said readout information, said information processing terminal and said telephone terminal with each other in a setting information table embodied on said server-connected main unit, wherein said setting information table comprises a plurality of associations between in formation processing terminals and telephone terminals for the purpose of routing calls to the current location of the information processing terminals; and said server-connected main unit being responsive to a request of said information processing terminal for call origination, response, or disconnection of said telephone terminal and carrying out call control for the call origination, the response, or the disconnection based on said association between said telephone terminal and said information processing terminal stored in said setting information table.

* * * * *